United States Patent [19]

Brown

[11] 3,968,740
[45] July 13, 1976

[54] COFFEEMAKER

[75] Inventor: Richard N. Brown, Macungie, Pa.

[73] Assignee: General Electric Company, Bridgeport, Conn.

[22] Filed: July 28, 1975

[21] Appl. No.: 599,411

[52] U.S. Cl. ............................ 99/289 R; 99/304
[51] Int. Cl.² ............................ A47J 31/40
[58] Field of Search ............ 99/289, 279, 280–281, 99/282–283, 286, 288, 290, 304, 305

[56] References Cited
UNITED STATES PATENTS

| | | | |
|---|---|---|---|
| 2,517,073 | 8/1950 | Alvarez | 99/286 X |
| 2,737,880 | 3/1956 | Johnson | 99/305 |
| 2,811,098 | 10/1957 | Pavlecka | 99/286 X |
| 3,220,334 | 11/1965 | Martin | 99/304 X |
| 3,327,615 | 6/1967 | Swan | 99/286 |
| 3,385,201 | 5/1968 | Martin | 99/282 |
| 3,606,829 | 9/1971 | Alwood | 99/280 |
| 3,693,535 | 9/1972 | Abel | 99/282 |

Primary Examiner—Leonard D. Christian
Assistant Examiner—Arthur O. Henderson
Attorney, Agent, or Firm—Leonard J. Platt; George R. Powers; John F. Cullen

[57] ABSTRACT

An electric drip coffeemaker wherein a dry ground coffee dispenser is supported at an upper overhanging portion of a housing, a carafe is positioned on a lower stand portion of the housing at one side of the dispenser, and a ground coffee basket is selectively positionable on guideways which are provided at the lower portion of the dispenser and at the top wall of the housing above the carafe.

7 Claims, 5 Drawing Figures

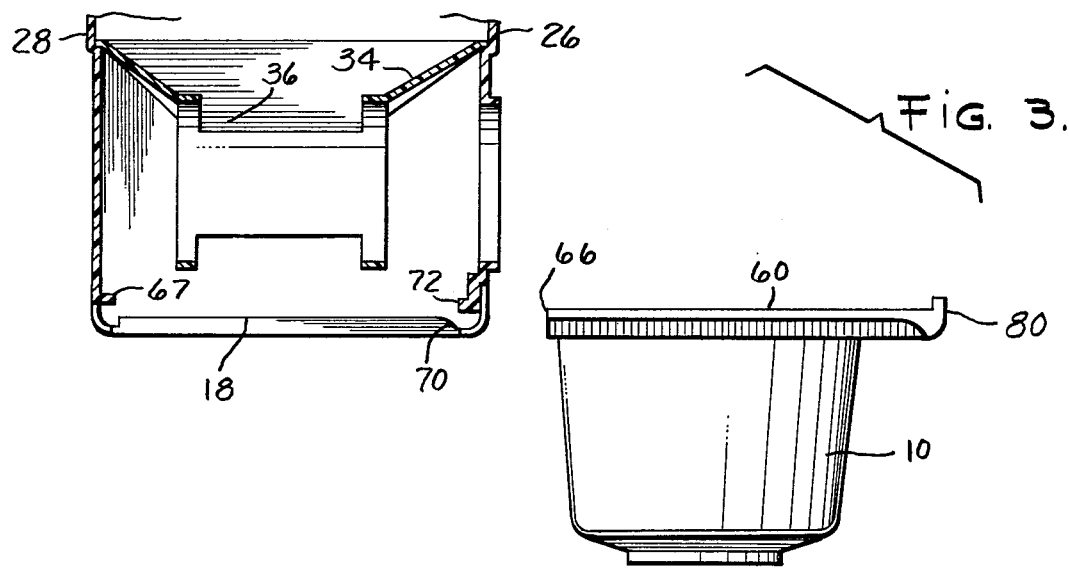
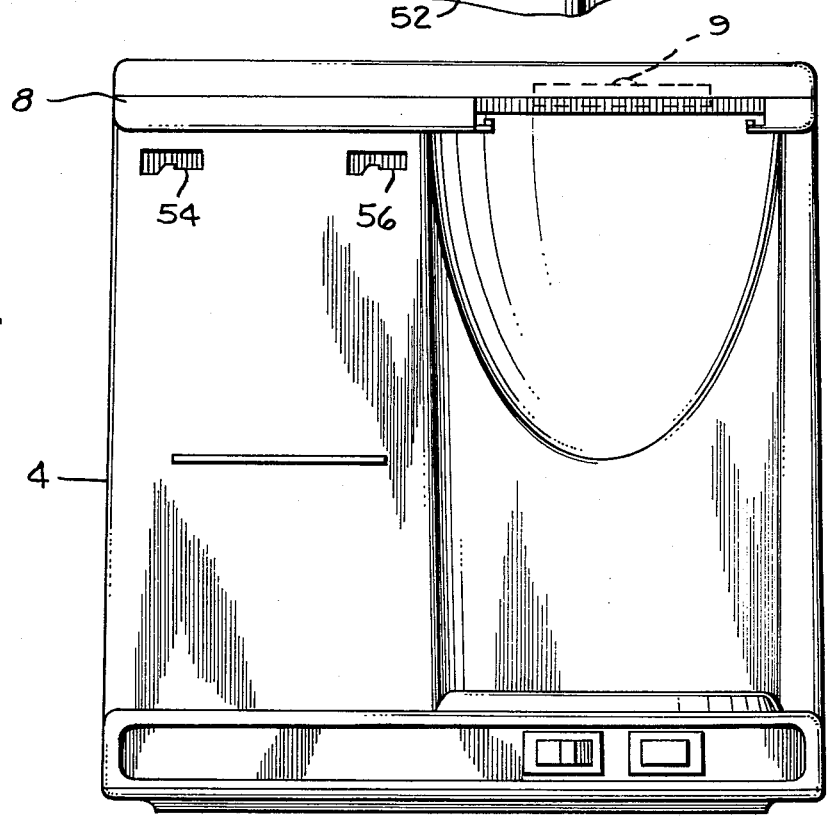

COFFEEMAKER

BACKGROUND OF THE INVENTION

1. FIELD OF THE INVENTION

This invention relates to an electric coffeemaker and, more particularly, to a drip coffee maker which is provided with a ground coffee basket that may be selectively positioned below a ground coffee dispenser and above a carafe.

2. DESCRIPTION OF THE PRIOR ART

In electric drip coffeemakers, it has been common practice to provide a molded plastic housing with a lower horizontal stand for holding a glass carafe, an upwardly extending wall which may be integrally molded with the stand, and a forwardly extending overhanging top wall which is located above the glass carafe for holding a coffee brew basket. With such a construction, the coffee brew basket may be filled with dry ground coffee and then positioned on the underside of the top wall of the housing. An electric water heater located within the plastic housing structure supplies heated water through an opening in the top wall of the housing and into the coffee brew basket. The heated water then flows through the grounds in the basket and brewed coffee flows from an aperture or apertures in a bottom wall of the brew basket into the glass carafe.

Some coffeemakers of this type have included a coffee brew basket which is provided with an outwardly extending flanged lip portion for insertion within supporting guideways or slots which are provided on the overhanging top wall portion of the plastic housing. Such a construction permits the coffee basket to be readily inserted in place on the housing and also holds the coffee basket on the housing when it is desired to remove the glass carafe for pouring. This invention is concerned with such electric drip coffeemakers and, more particularly, with a construction for reliably holding a ground coffee basket on the dispenser while it is being filled with ground coffee, and a construction for holding the ground coffee basket while hot water is flowing through the basket, with the holding constructions being so related to each other that the ground coffee basket may be readily moved from a filling position to a brewing position.

SUMMARY OF THE INVENTION

Accordingly, it is a particular object of my invention to provide an improved coffeemaker construction for conveniently holding a ground coffee basket on a coffeemaker.

It is a further object of my invention to provide a coffeemaker with a construction wherein a coffee brew basket may be filled with ground coffee without placing the apertured bottom wall of the coffee basket on a table or shelf where it might be contaminated with foreign material such as salt, flour or condiments which could seriously impair the taste of a good cup of coffee.

It is also an object of my invention to provide an electric drip coffeemaker which may be readily formed and constructed of relatively few parts which may be easily manufactured at relatively low cost.

In accordance with one of the aspects of this invention, an electric coffeemaker includes a housing having a hollow generally vertical rear wall, a generally horizontal stand portion and an overhanging top wall which extends generally horizontally from an upper portion of the vertical rear wall. A ground coffee dispenser is positioned on the vertical wall a substantial distance above the lower stand portion of the housing and a carafe for brewed coffee is positioned on the stand at one side of the ground coffee dispenser. A hot water outlet is provided in the overhanging top wall directly above the carafe and at one side of the ground coffee dispenser. A ground coffee basket is provided with an outwardly extending lip at its upper portion so that it may be supported thereby. Supporting guide rails are formed at the lower portion of the ground coffee dispenser for receiving the lip portion of the ground coffee basket to hold the coffee basket on the dispenser while it is being filled with dry ground coffee and another pair of supporting guide rails are provided in the overhanging top wall of the housing above the carafe for supporting the ground coffee basket while coffee is being brewed. With this construction, the ground coffee basket may be first positioned on the guide rails below the coffee dispenser where it may be filled with dry ground coffee and then readily positioned on the guide rails which are provided in the top overhanging wall of the coffeemaker to receive heated water for brewing coffee.

In addition, with this construction, after the coffee brew basket has been suitably cleaned and dried, it may again be placed on its guide rails below the ground coffee dispenser where it will be in position for receiving another measured amount of coffee. Moreover, the bottom wall of the ground coffee basket will be held above the stand or any supporting surface so that its lower wall and the aperture which is formed therein cannot become contaminated with materials that could be left on a counter or supporting table.

Moreover, the construction is achieved with relatively few additional parts which may be readily formed. The guide rails on the dispenser may be integrally molded with the dispenser, and the guide rails on the overhanging wall may be integrally molded with the housing.

BRIEF DESCRIPTION OF THE DRAWING

Other objects and attendant advantages of the invention will be apparent from the following description taken in connection with the accompanying drawing in which:

FIG. 3 is a fragmentary cross-sectional view of the dispenser and the coffee basket taken substantially on the plane of 3—3 of FIG. 2;

FIG. 4 is a fragmentary rear elevational view of the dispenser shown in FIG. 1; and FIG. 5 is a fragmentary front elevational view of the electric coffeemaker housing shown in FIG. 1 with the dispenser removed from the housing.

DESCRIPTION OF THE PREFERRED EMBODIMENT

Figure 1:
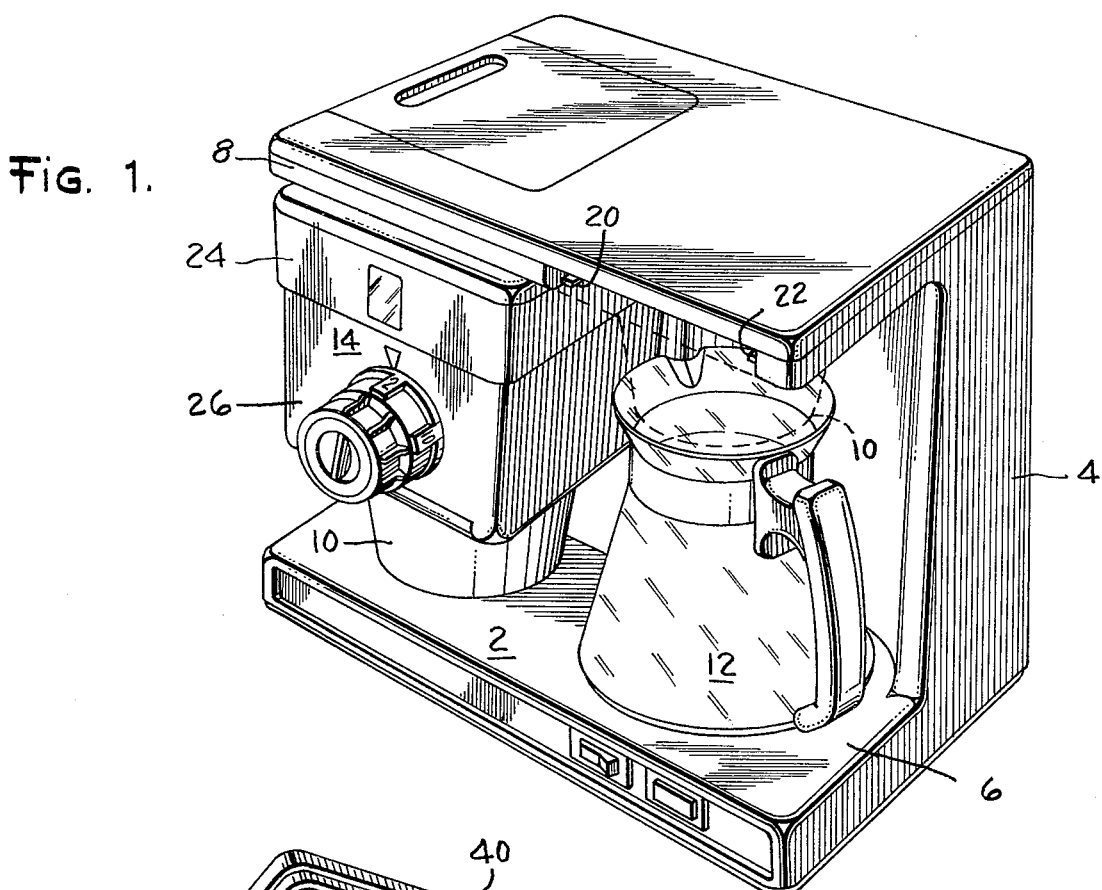
FIG. 1 is a front perspective view of an electric coffeemaker which includes a coffee basket and a guideway for holding the basket on a ground coffee dispenser and a guideway for holding the coffee basket above a carafe while coffee is being brewed constructed in accordance with my invention.

Referring now to the drawing and first particularly to FIG. 1, there is shown an electric drip coffeemaker which includes my unique construction for selectively holding a ground coffee basket below a dispenser while it is being filled with ground coffee and above a carafe while coffee is being brewed. As shown, the coffeemaker includes a housing 2 having a generally vertical hollow rear wall 4 and a hollow stand portion 6. An overhanging hollow top wall 8 extends forwardly from the upper portion of the rear wall and, as shown in FIG. 5, an outlet 9 is provided in the top wall 8 for delivering heated water to a ground coffee basket 10, shown in dotted lines in FIG. 1. A carafe 12 is suitably supported on the stand 6 of the coffeemaker for receiving the brewed coffee from the coffee basket 10.

My improved guideway construction for selectively holding the coffee basket 10 below a dispenser 14 or above the carafe 12 includes guide rails 16 and 18 that are integrally formed at the bottom of the dispenser 14, and guide rails 20 and 22 that are integrally formed with the top wall 8 of the coffeemaker. The rails 16, 18, 20 and 22 are arranged generally parallel to each other so that the basket 10 may be readily moved from its position below the dispenser 14 by simply pulling it forwardly from the dispenser, transporting it upwardly to the right, and then pushing it rearwardly onto the guide rails 20 and 22 in the overhanging wall 8 of the coffeemaker.

Figure 2:
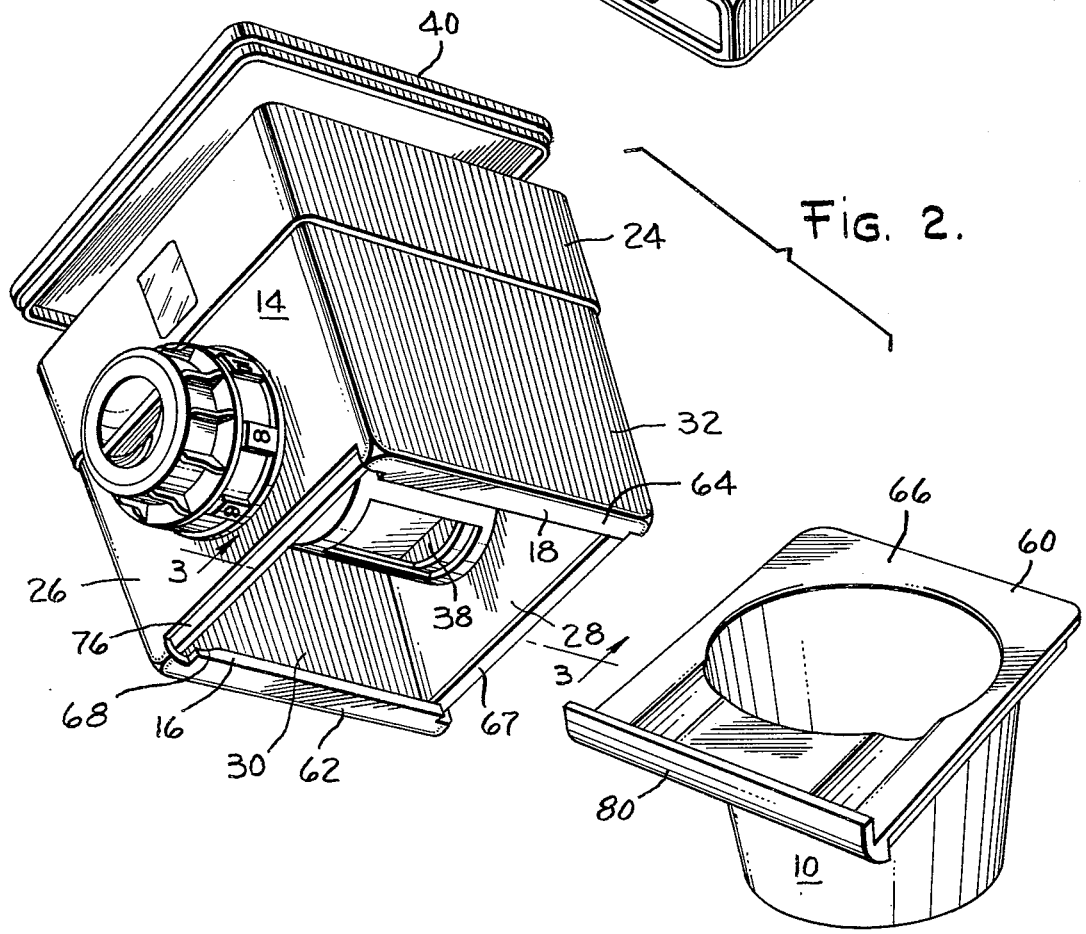
FIG. 2 is a bottom perspective view of the dispenser and its cover, and a top perspective view of the ground coffee basket illustrated in FIG. 1.

With particular reference to FIGS. 1, 2 and 3, it can be seen that the dispenser 14 may include a generally rectangular canister 24 for holding dry ground coffee. The canister has a generally flat front wall 26, a rear wall 28, depending side walls 30 and 32, and a sloped bottom wall 34 for guiding ground coffee toward an enlarged aperture 36 that is provided adjacent to a dispensing drum 38.

The details of the dispensing mechanism for delivering a quantity of ground coffee through the dispensing aperture 36 by rotating the dispensing drum 38 does not form a part of this invention, and is described and illustrated in greater detail in my co-pending application (6D-4735) Ser. No. 599,410, assigned to the same assignee as the present invention.

The canister is constructed so that it may be conveniently removed from the vertical rear wall 4 of the coffeemaker for filling and, as shown in FIGS. 4 and 5, it is provided with two lugs 50 and 52 on its rear wall 28 which are appropriately positioned within or removed from their complementary L-shaped slots 54 and 56 that are provided in the vertical rear wall. As shown more particularly in FIGS. 2, 4 and 5, the canister 24 includes a cover 40 which may be removed for filling the canister with a supply of ground coffee.

The guide rails 16 and 18 at the bottom portion of the dispenser and an upper outwardly extending lip portion 60 of the coffee basket 10 are uniquely constructed with respect to each other so that in addition to readily positioning and holding the coffee basket 10 below the dispenser these parts provide a very effective closure for the bottom of the dispenser to prevent foreign particles from entering the dispenser and the inside of the coffee basket. To achieve this low cost construction, the entire canister including the guide rails 16 and 18 may be integrally molded from low cost plastic. As shown more particularly in FIG. 2, the side walls 30 and 32 extend downwardly below the rear wall 28, each of the walls 30 and 32 includes an inwardly extending flange 62 and 64, respectively, and the guide rails 16 and 18 extend upwardly from the flanges 62 and 64, respectively.

The rear wall 28 of the dispenser 14 is provided with an inwardly extending flange 67 which is spaced from the plane of the top surfaces of the rails 16 and 18 a distance which is slightly more than the thickness of the rear portion 66 of the lip of the coffee basket so that the upper surface of the lip portion 66 will be held very close to the flange 67 to prevent any dust or other material from entering the bottom of the canister.

The forward portions of the guide rails 16 and 18 are inclined downwardly at 68 and 70 and the distance between the forwardmost portion of each of the guide rails to the lowermost portion 72 of the front wall 26 of the canister is substantially greater than the thickness of the outwardly extending lip 60 of the ground coffee basket so that the lip 60 of the basket may be readily inserted on the guide rails without the need for a threading-type motion. Thus, when it is desired to position the coffee basket 10 on the guide rails 16 and 18, the rear lip portion 66 of the basket may be readily inserted into the relatively large space between the lowermost portion of the inclined guide rails and the lower portion 72 of the front wall and simply slid rearwardly. Naturally, during such motion, the inclined surfaces 68 and 70 of the guide rails will cause the lip 60 to be lifted to a position closer to the lower wall 72.

In order to further ensure a close fit between the coffee basket and the canister to prevent dirt and other foreign material from entering the basket or the canister, the lower portion 72 of the front wall of the canister is undercut to provide a groove 76 for receiving an upwardly extending flange 80 that is formed at the front of the forwardly extending lip 60 of the coffee basket 10.

The guide rails 20 and 22 and the other portions of the guide rail means that is provided in the overhanging top wall 8 of the coffeemaker are constructed to be of the same size and shape as the guide rail components that are provided at the bottom of the dispenser.

In operation, it can be appreciated that the dispenser 14 should be removed from the housing wall 4 and filled with a quantity of ground coffee. Then the relatively tight-fitting cover 40 is placed on the top of the dispenser and the dispenser is positioned on the vertical rear wall 4 of the coffeemaker by positioning the lugs 50 and 52 on the rear wall of the canister into the slots 54 and 56 that are provided in the vertical wall 4 of the housing. Then the front lip portion 80 of the coffee basket 10 may be gripped and the rear lip portion 66 placed on the inclined front portions 68 and 70 of the guide rails. The basket 10 is then pushed rearwardly so that the rear lip 66 is pushed below and close to the inwardly extending flange 67 of the rear canister wall, and the front surface of the front basket flange 80 will be in substantially the same plane as the front surface of the front wall 26 of the canister so that foreign material will be prevented from entering the canister and basket. The dispensing drum 38 may then be rotated an appropriate number of turns to dispense a measured quantity of dry ground coffee into the basket 10. To position the basket 10 in its brewing position, it is merely necessary to slide the basket outwardly from the dispenser 14, transport it upwardly to the right and then inwardly on the rails 20 and 22 that are provided in the overhanging wall of the housing.

It can be appreciated that with the rails on the dispenser arranged generally parallel to the rails on the overhanging wall of the coffeemaker, the basket does not have to be reoriented in order to position it from one set of rails to the other set of rails, and thus a unique construction which may be conveniently and easily operated has been achieved.

Moreover, with my unique guide rail constructions for holding a coffee basket on a dispenser or above a carafe, the coffee brew basket 10 may be filled with dry ground coffee without placing the apertured bottom wall of the basket 10 on a table or shelf where it might be contaminated with foreign material such as salt, flour or condiments which could seriously impair the taste of a good cup of coffee.

In view of the foregoing, it can also be appreciated that my improved guide rail construction may be readily formed and provided with relatively few parts. The guide rails 16 and 18 on the dispenser and all of the walls and flanges 76, 62, 64 and 67 are simply integrally molded at the same time that the walls of the canister are being formed. In like manner, the generally corresponding guide rail construction 20 and 22 that is formed in the overhanging wall of the coffeemaker may be integrally molded at the same time that the housing is being molded. The lip 60 and flange 80 of the basket 10 are also readily formed at the same time that the basket 10 is being molded. Thus, an exceedingly simple and reliable mechanism is achieved with the use of relatively few parts.

What I claim is:

1. An electric coffeemaker comprising:
   a. a housing having a hollow generally vertical rear wall, a generally horizontal stand portion extending outwardly from a lower portion of said rear wall, and an overhanging wall extending outwardly from an upper portion of the vertical rear wall;
   b. a ground coffee dispenser positioned on said generally vertical wall a substantial distance above the lower stand portion of said housing;
   c. a carafe for brewed coffee positioned on the lower stand portion of said housing at one side of said ground coffee dispenser and under said overhanging wall;
   d. means for discharging heated water through an outlet which is provided in the overhanging wall of said housing above said carafe;
   e. a ground coffee basket having an outwardly extending lip at its upper portion;
   f. a supporting guide rail means formed at a lower portion of said ground coffee dispenser for receiving the lip portion of said coffee basket to removably support said coffee basket below said ground coffee dispenser; and
   g. a supporting guide rail means provided in the overhanging top wall of said housing above said carafe and at one side of said ground coffee dispenser for receiving the lip portion of said coffee basket to removably support said coffee basket on the top wall of said housing above said carafe so that said ground coffee basket may be first positioned on the guide rail means below said coffee dispenser to receive ground coffee, and then positioned on the guide rail means provided in the top wall of the housing to receive heated water from said heated water outlet.

2. An electric coffeemaker comprising:
   a. a housing having a hollow generally vertical rear wall, a generally horizontal stand portion extending forwardly from a lower portion of said rear wall, and a generally horizontal overhanging top wall extending generally forwardly from an upper portion of the vertical rear wall;
   b. a ground coffee dispenser positioned on said generally vertical wall a substantial distance above the lower stand portion of said housing, said dispenser including a canister having a front wall, a rear wall, two downwardly extending side walls, and bottom wall means, and an enlarged opening provided in the bottom wall means of said canister;
   c. a carafe for brewed coffee positioned on the lower stand portion of said housing at one side of said ground coffee dispenser and under said overhanging top wall;
   d. means for discharging heated water through an outlet which is provided in the top wall of said housing above said carafe;
   e. a ground coffee basket having an outwardly extending lip at its upper portion;
   f. each of said downwardly extending side walls including an integrally formed inwardly extending flange and an integrally formed upwardly extending guide rail, each of said guide rails extending a substantial distance along the inside of said downwardly extending side walls for receiving the lip portion of said coffee basket to removably support said coffee basket below said ground coffee dispenser; and
   g. a supporting guide rail means provided in the overhanging top wall of said housing above said carafe and at one side of said ground coffee dispenser for receiving the lip portion of said coffee basket to removably support said coffee basket on the top wall of said housing above said carafe so that said ground coffee basket may be first positioned on the guide rail means below said coffee dispenser to receive ground coffee, and then positioned on the guide rail means provided in the top wall of the housing to receive heated water from said heated water outlet.

3. An electric coffeemaker as defined in claim 2 wherein the supporting guide rail means provided in the overhanging top wall of said housing above said carafe comprises a pair of generally parallel guide rails spaced the same distance from each other as the guide rails that are formed on the canister, and all of said guide rails are arranged generally parallel to each other and extending forwardly and rearwardly so that the ground coffee basket may be readily and conveniently moved from the ground coffee dispenser to the overhanging wall with a simple forward, sideward, and then rearward motion.

4. An electric coffeemaker as defined in claim 2 wherein the front portion of each of said guide rails is inclined downwardly and the distance from the forwardmost portion of each of said guide rails to the lowermost portion of the front wall of said canister is substantially greater than the thickness of the outwardly extending lip of the ground coffee basket so that the lip portion of the ground coffee basket may be readily positioned on said guide rails so that said coffee basket is first lifted upwardly as it is slid rearwardly on said guide rails.

5. An electric coffeemaker as defined in Claim 2 wherein the rear wall of the dispenser is provided with an inwardly extending flange which is spaced from the top surfaces of the guide rails a distance which is slightly more than the thickness of the rearwardly extending lip of the coffee basket so that the upper surface of the rear lip portion of the basket will be held very close to the rear wall canister flange to prevent any dust or other material from entering the bottom of the canister.

6. An electric coffeemaker as defined in claim 2 wherein the ground coffee basket includes a forwardly extending lip wall portion and an integrally formed upwardly extending flange at the front of said forwardly extending lip wall portion so that when said coffee basket is positioned on said dispenser the top of said flange is positioned very close to the lower edge of the front wall to prevent any foreign material from entering the coffee brew basket from the space between the basket and the front wall of the dispenser.

7. An electric coffeemaker as defined in claim 6 wherein a generally horizontal groove is provided along the lower portion of the front wall of the canister for receiving the upwardly extending flange of the coffee brew basket so that when the coffee brew basket is positioned on the guide rails and moved to its rearmost position the surface of the front wall of the flange will be in substantially the same plane as the surface of the front wall of the canister so that foreign material will be prevented from entering the space between the flange and the front wall of the canister.

* * * * *